(12) United States Patent
Kleine-Brockhoff et al.

(10) Patent No.: US 8,814,747 B2
(45) Date of Patent: Aug. 26, 2014

(54) PLANETARY CARRIER OF A PLANETARY GEARING

(71) Applicant: Robert Bosch GmbH, Stuttgart (DE)

(72) Inventors: Ralf Kleine-Brockhoff, Dorsten (DE);
Dominikus Daners, Herten (DE);
Miroslaw Roszkowski, Bochum (DE);
Marco Lehmann, Wuppertal (DE);
Claudia Schweihoff, Bochum (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/919,834

(22) Filed: Jun. 17, 2013

(65) Prior Publication Data
US 2013/0337967 A1 Dec. 19, 2013

(30) Foreign Application Priority Data
Jun. 18, 2012 (DE) .......................... 10 2012 012 097

(51) Int. Cl.
*F16H 57/08* (2006.01)
(52) U.S. Cl.
USPC .......................... 475/331; 74/606 R
(58) Field of Classification Search
USPC .......................... 475/331; 74/606 R
See application file for complete search history.

(56) References Cited

U.S. PATENT DOCUMENTS

| 3,939,736 | A | * | 2/1976 | Morin | 475/338 |
| 4,983,152 | A | * | 1/1991 | Kimberlin et al. | 475/331 |
| 5,558,593 | A | * | 9/1996 | Roder et al. | 475/331 |
| 8,491,436 | B2 | * | 7/2013 | Duong et al. | 475/159 |
| 2003/0162630 | A1 | * | 8/2003 | Poulin et al. | 475/331 |
| 2003/0181283 | A1 | * | 9/2003 | Chen | 475/331 |
| 2012/0028754 | A1 | * | 2/2012 | Lopez et al. | 475/331 |
| 2013/0184114 | A1 | * | 7/2013 | Norem et al. | 475/159 |

FOREIGN PATENT DOCUMENTS

EP 1 186 804 B1 3/2002

* cited by examiner

*Primary Examiner* — Justin Holmes
(74) *Attorney, Agent, or Firm* — Maginot, Moore & Beck (57) ABSTRACT

A planetary carrier of a planetary gearing includes two planet web cheeks interconnected by planet webs. The sides of the planet web cheeks are mutually opposed in the circumferential direction and, together with outer lateral surfaces of the planetary webs, define lateral surface openings. At least one planet pin opening for receiving a pin for mounting a planet gear is provided in at least one planet web cheek. At least one planet web cheek, in the region of the attachment of a planet web, has a transition reducing the axial length of the planet web. The planetary carrier is optimized in terms of weight and strength by way of the transition having a rounded contour in the form of a spherical recess.

15 Claims, 7 Drawing Sheets

PLANETARY CARRIER OF A PLANETARY GEARING

This application claims priority under 35 U.S.C. §119 to patent application no. DE 10 2012 012 097.4, filed on Jun. 18, 2012 in Germany, the disclosure of which is incorporated herein by reference in its entirety.

BACKGROUND

The disclosure relates to a planetary carrier of a planetary gearing, comprising two planet web cheeks interconnected by means of planet webs, the sides of the planet web cheeks mutually opposed in the circumferential direction, together with outer lateral surfaces of the planetary webs, defining lateral surface openings, at least one planet pin opening for receiving a pin for mounting a planet gear being provided in at least one planet web cheek, and at least one planet web cheek, in the region of the attachment of a planet web, having a transition reducing the axial length of the planet web.

A planetary carrier of this type is known from EP 1 186 804 B1. This planetary carrier formed as a one-part cast part has two planet web cheeks, which are interconnected via centrally narrowed planet webs. The planet web cheeks have straight, lateral chamfers, which cooperate with the planet webs. In addition, the planet webs form trapezoid profiles tapered towards the middle in the radial and tangential direction of the planetary carrier.

The object of the disclosure is to provide a planetary carrier that is optimized in terms of weight and strength.

SUMMARY

This object is achieved in that the transition has a rounded contour. Compared to a straight chamfer, a rounded contour can be better adapted to lines of flux in the planetary carrier and can therefore be designed in a manner much better optimized in terms of strength. It is thus also possible to reduce the wall thickness of the planetary carrier in particular in the region of the transition between the respective planet web cheek and the planet web, thus producing the desired optimization in terms of weight.

In a development of the disclosure, the planet web has a closed or open geometry, which is preferably a triangular geometry, and the transition has a concave contour. The closed or open triangular geometry contributes to an optimization of strength, in particular with regard to a conceivable rotation of the two planet web cheeks, wherein the open triangular geometry has considerable weight advantages compared to the closed triangular geometry. With a hollow design, the planet webs formed with the triangular geometry are also known as hearts. The concave contour of the transition is optimized in terms of strength on the one hand, and on the other hand can be produced favorably in a corresponding casting mold in the case of a planetary carrier fabricated from a cast metal. Here, an inwardly turned, rounded geometry can be formed between the planet web and the planet web cheek and can be produced without difficulty in a casting mold.

In a development of the disclosure, the concave contour is shaped in the manner of a spherical recess. This is the preferred embodiment, which can be cast without difficulty. In addition, all transitions between the planet web cheeks and the planet webs are preferably formed in this manner in accordance with the disclosure. It is nevertheless also possible within the scope of the disclosure to form only specific individually selected transitions in accordance with the disclosure, whilst the rest of the transitions are formed conventionally.

In a development of the disclosure, the planet web has a cavity arranged in the axial direction of the planetary carrier. This cavity can be closed at least in part on a planet web cheek by a cast wall. This embodiment optimizes strength with low material use, for example by providing the driven planet web cheek with a cast wall closing the cavity at least in part.

In a further embodiment of the disclosure, the planet web cheek has a projection on the outer circumference. This projection is formed as a bead and can be arranged axially or radially. This projection or bead can be interrupted in the region of the attachment of the planet web to the planet web cheek. The projection or the bead can be arranged inwardly or outwardly (as viewed axially from the planet web cheek). Furthermore, the projection or the bead can be arranged only above the planet pin openings. Lastly, the projection or the bead can run into the inwardly turned face of the planet web or may even cross over this area.

In a development of the disclosure, the planet web cheek, between the planet web and the planet pin opening, has a thickening of the wall in the form of a protuberance. This thickening can be designed selectively for optimization of strength, and to this end the thickening in a further embodiment can be formed so it becomes outwardly thicker in the radial direction in a triangular manner. Furthermore, the thickening can run into the previously described projection or bead.

In a further embodiment, the spherical recess, the projection or the bead, and the protuberance are rounded and homogenized relative to one another. This embodiment also contributes to an optimization of strength. Furthermore, the thickening leads into the projection or the bead.

In a development of the disclosure, an axial eyeglass-frame contour is arranged on a planet pin opening and transitions inwardly into a circumferential rib surrounding a central bore and outwardly into the outer bead. This eyeglass-frame contour is created by thickened transitions, which in turn on the whole constitute an optimization in terms of strength.

In particular the projection or the bead can be radially waved. The planet pin opening can be radially outwardly reinforced or thickened. Between the planet pin opening and the planet web cheek, said planet web cheek can be formed so as to be radially inwardly turned and then radially outwardly projecting again towards the planet web.

In a development of the disclosure, an indentation is provided on the inner face of the planet web cheek in the transition to a central bore for a sun gear shaft carrying a sun gear. This indentation causes an optimization in terms of casting and an optimization of strength.

In a further embodiment of the disclosure, the lateral surface of the web has a radial bulge. This outwardly protruding radial bulge can be cast easily and likewise contributes to an optimization of strength.

In a development of the disclosure, an opening in the form of an aperture is formed in the transition or the attachment of the planet web to a planet web cheek. This aperture, with a neutral influence on strength, leads to an optimization of weight and enables an (axial) entry into the cavity of gear oil, which can be fed to the teeth of the various gearwheels and to the bearings as the planetary carrier revolves.

In a further embodiment of the disclosure, the planet web has at least one through-hole formed in a circumferential wall of the triangular geometry. This through-hole enables the use of a single core to reproduce the planet gear space and the cavity in the case of a cast planetary carrier, since these spaces are interconnected by the through-hole.

The planetary carrier is preferably part of a fluid flow power plant transmission, in particular of a tidal power plant transmission or of a wind turbine transmission.

BRIEF DESCRIPTION OF THE DRAWINGS

Further advantageous embodiments of the disclosure can be inferred from the description of the drawings, in which exemplary embodiments of the disclosure illustrated in the figures are described in greater detail.

In the drawings.

DETAILED DESCRIPTION

Figure 1:
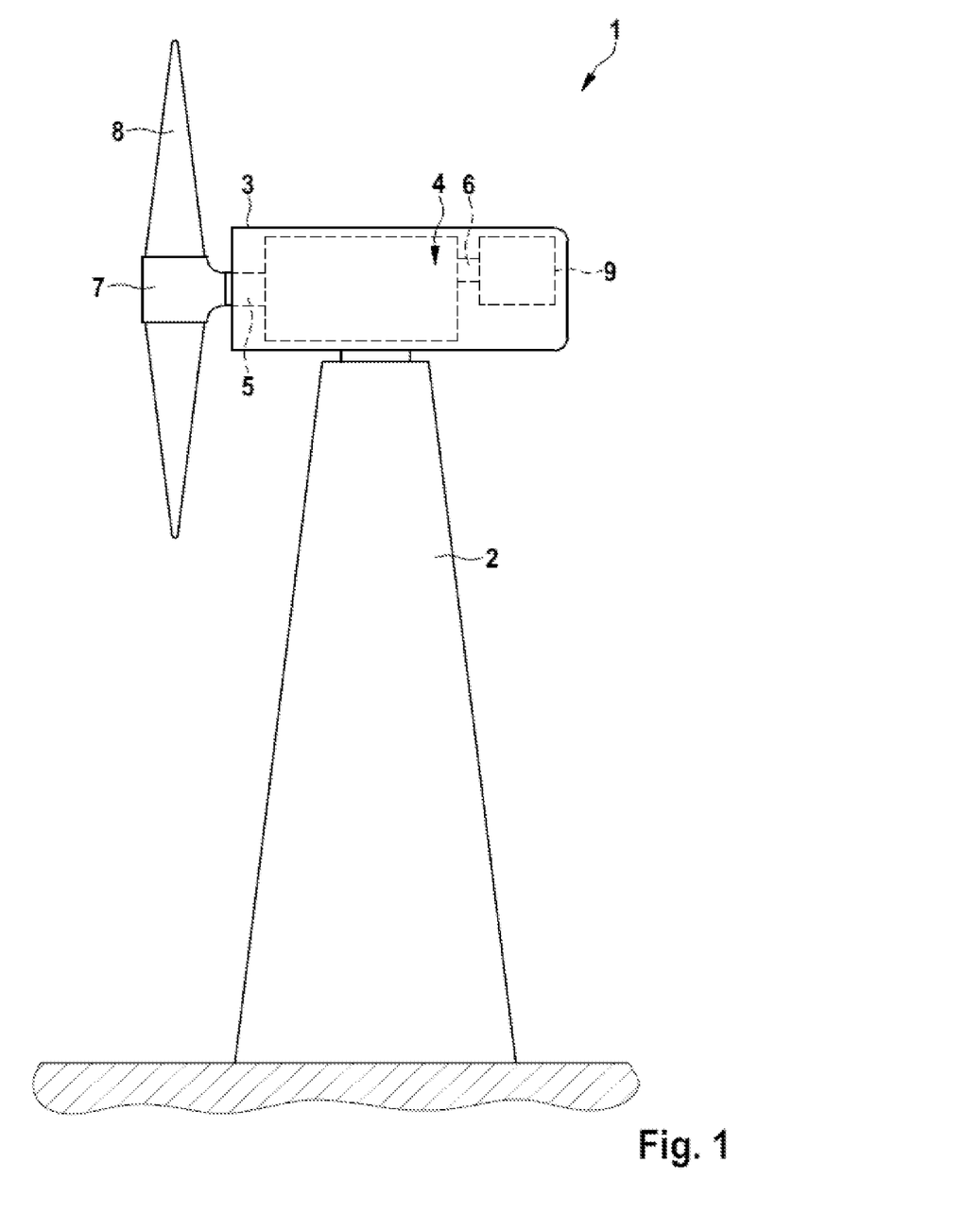
FIG. 1 shows a schematic side view of a wind turbine with a generator transmission comprising a planetary carrier embodied in accordance with the disclosure.

FIG. 1 shows a side view of a wind turbine 1 with its main modules. The wind turbine 1 has a tower 2, on which a nacelle 3 in the form of a machine housing is arranged rotatably about a vertical axis. A generator transmission 4 is mounted in the nacelle 3 in a manner fixed against rotation, wherein the generator transmission 4 has a drive shaft 5 and an output shaft 6. The drive shaft 5 of the generator transmission 4 is connected to a hub 7 of a rotor having a plurality of rotor blades 8. The output shaft 6 is rotatably connected to a drive device, to be driven, in the form of a generator 9. The generator transmission 4 is designed such that is converts a slow rotational movement of the drive shaft 5 into a quick rotational movement of the output shaft 6. To this end, the generator transmission 4 has one or more planetary stages, which cooperate via a terminal cylindrical gearing or directly with the output shaft 6. At least one of the planetary stages has a planetary carrier formed in accordance with the disclosure, which will be described in the following figures. By means of the wind turbine 1, electrical energy is generated since the rotor rotated by the wind introduces the rotational movement transmitted to the drive shaft 5 into the generator transmission 4. The generator transmission 4 converts the rotational movement into a quicker rotational movement, and, lastly, the quick rotational movement is transferred to the generator 9 via the output shaft 6 in order to generate power.

Figure 2:
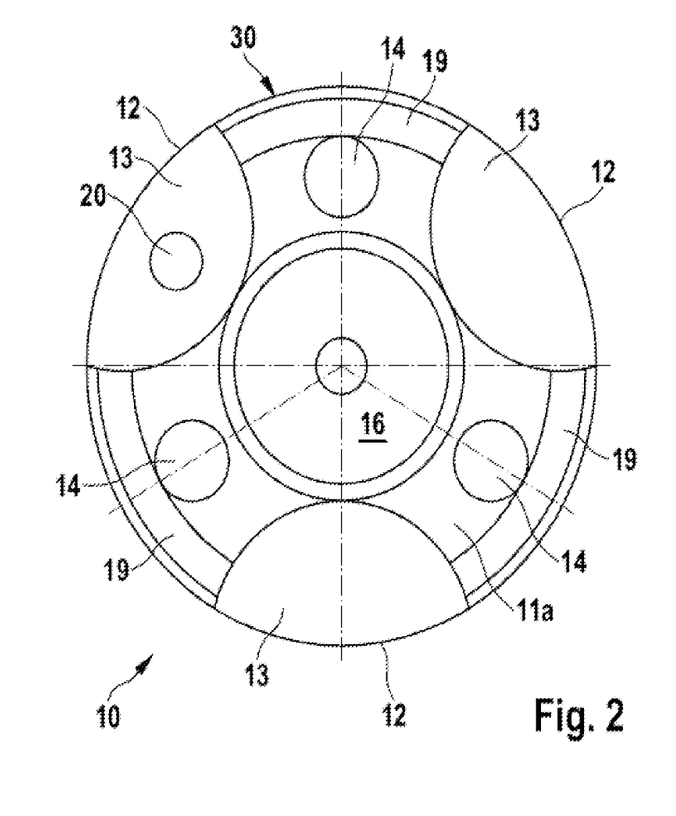
FIG. 2 shows a front view of a planetary carrier formed in accordance with the disclosure.

FIG. 2 shows a front view of a planetary carrier 10 formed in accordance with the disclosure, which is installed in the generator transmission 4. As shown in FIGS. 2 to 6, the planetary carrier 10 has two planet web cheeks 11a, 11b, which are interconnected via three planet webs 12 (see also FIG. 4) distributed on the circumference of the planet web cheeks 11a, 11b. In the region of the attachment of a planet web 12 to a planet web cheek 11a, 11b, the corresponding planet web cheek 11a, 11b is formed in the manner of a spherical recess 13 with a transition reducing the axial length of the planet web 12. The embodiment in the shape of a spherical recess causes an optimization of weight and strength of the planetary carrier 10. In the region between the three planet webs 12 distributed on the circumference of the planet web cheeks 11a, 11b and comprising the spherical recesses 13, three planet pin openings 14 are formed in the planet web cheeks 11a, 11b. A pin holding a planet gear is inserted into two planet pin openings 14 aligned with one another when the generator transmission 4 is assembled. One of the planet pin openings 14 aligned with one another can be formed as a blind hole opening and consequently cannot fully penetrate the corresponding planet web cheek 11a, 11b. Furthermore, it is also possible in principle to form a planet pin opening 14 in just one planet web cheek 11a, 11b, said planet pin opening alone carrying the pin. Each of the three planet gears is arranged in the region of a planet gear space 15 formed between the planet web cheeks 11a, 11b between two adjacent planet webs 12 and is introduced into the planet gear space 15 through a lateral surface opening 30 between the adjacent planet webs 12. The planetary carrier 10 has a through-opening 16, in the region of which a sun gear is arranged. The sun gear is meshed with the planet gears in the assembled state and is centered thereby.

On one side, the planetary carrier 10 has a tubular extension 17, which forms the drive for the planetary carrier 10. To the right and left outside the planet web cheeks 11a, 11b, bearing regions 18a, 18b are provided, on which rolling bearings for mounting the planetary gear 10 in the generator transmission housing are arranged.

Figure 3:
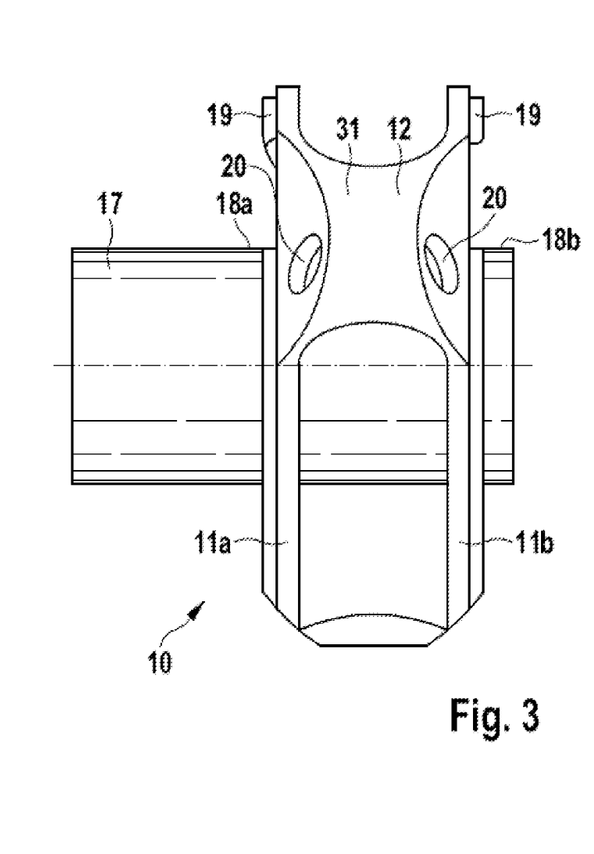
FIG. 3 shows a side view of a planetary carrier according to FIG. 2.

As is shown in FIGS. 2 and 3, in the region between two adjacent spherical recesses 13, the planet web cheeks 11a, 11b have projections adjoining the three lateral surface openings 30, said projections being provided in the form of beads 19 following the outer contour of the planet web cheeks 11a, 11b. The beads 19 preferably run into the spherical recesses 13. Furthermore, the opposed left-hand, upper spherical recesses 13 in FIG. 2 are provided with an aperture 20, which constitutes a further optimization of weight. The aperture 20 is likewise illustrated in FIGS. 3 and 4.

Figure 4:
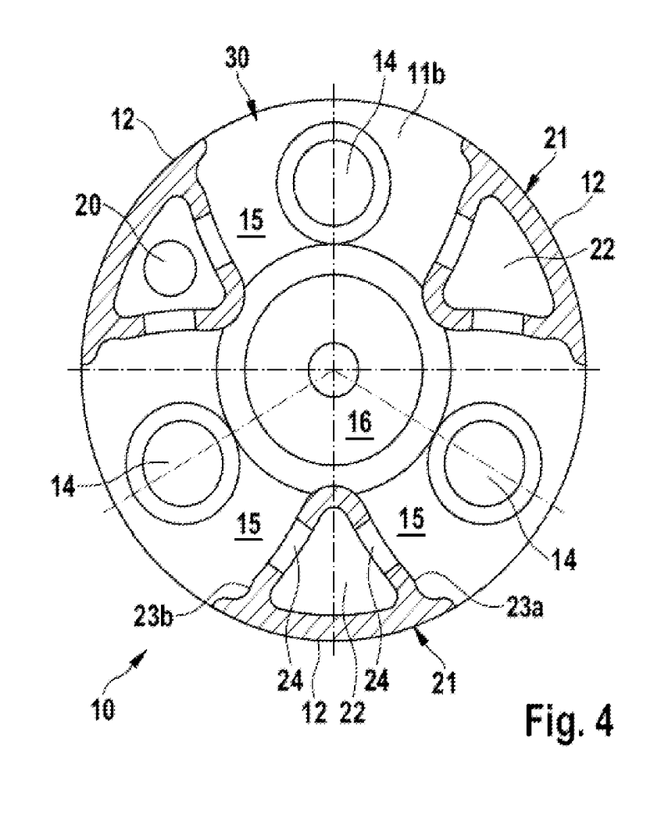
FIG. 4 shows a cross section through the planetary carrier according to the disclosure.

FIG. 4 shows a cross section through the planetary carrier 10 according to FIG. 2. In this sectional illustration, a triangular geometry 21 of the planet webs 12 can be seen, wherein it can also be seen that the planet webs 12 are hollow and have a cavity 22. In opposed circumferential walls 23a, 23b of the planet webs 12, through-holes 24 are formed, which connect the respective cavity 22 to adjacent planet gear spaces 15. The through-holes 24 make it possible to use a single core, which, inserted into a casting mold, forms the inner cavities of the cast planetary carrier 10. The through-holes 24 can have any embodiment and may also completely cut away parts of the circumferential walls 23a, 23b. For example, it is thus also conceivable to completely cut away the inner tip of the triangular geometry 21 pointing towards the central bore 16. Furthermore, the through-holes 24 on opposed circumferential walls 23a, 23b can be formed differently and arranged asymmetrically with respect to one another. Furthermore, the cavity 22 in the region of a planet web cheek 11a, 11b can be closed in part or completely. Similarly to the illustrations in FIGS. 2 and 3, an aperture 20 is formed in the left-hand, hand, upper spherical recess 13 of the planet web 12 in the region of the planet web cheek 11b.

Figure 6:
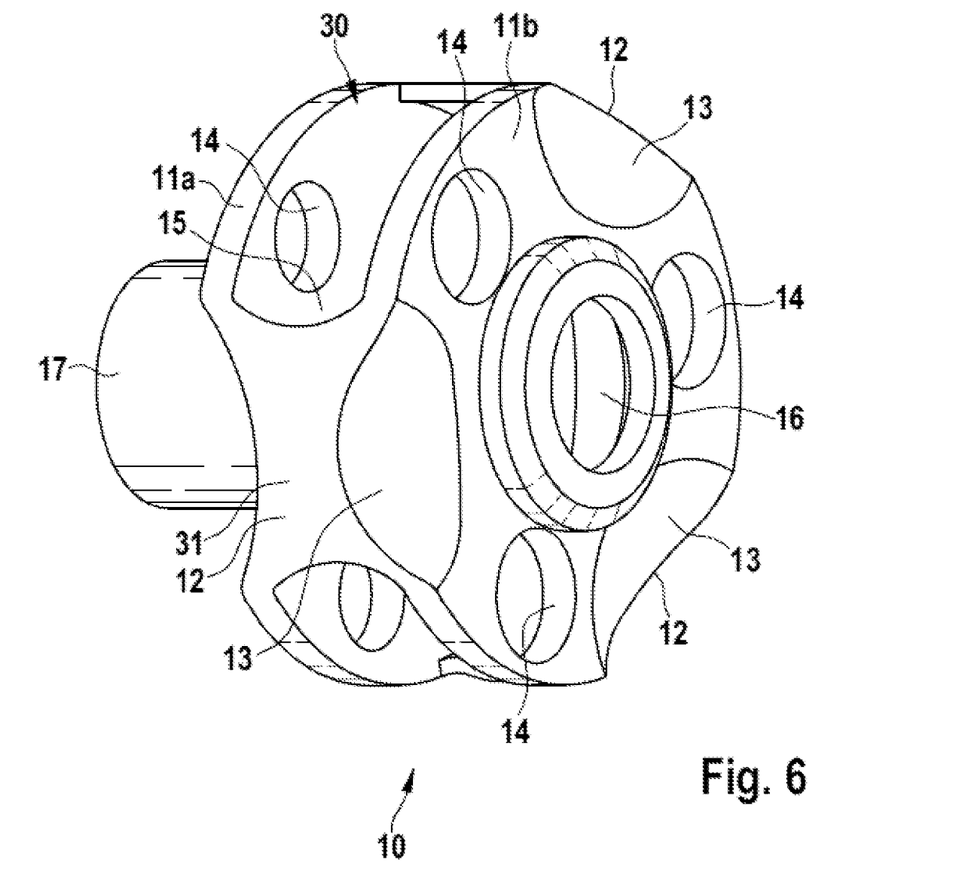
FIG. 6 shows a perspective view of a planetary carrier according to the disclosure.

FIG. 6, in a perspective view, shows the embodiment of the planetary carrier 10, which in the illustration according to FIG. 6 is formed without a through-hole 24 in the spherical recess 13.

Figure 5:
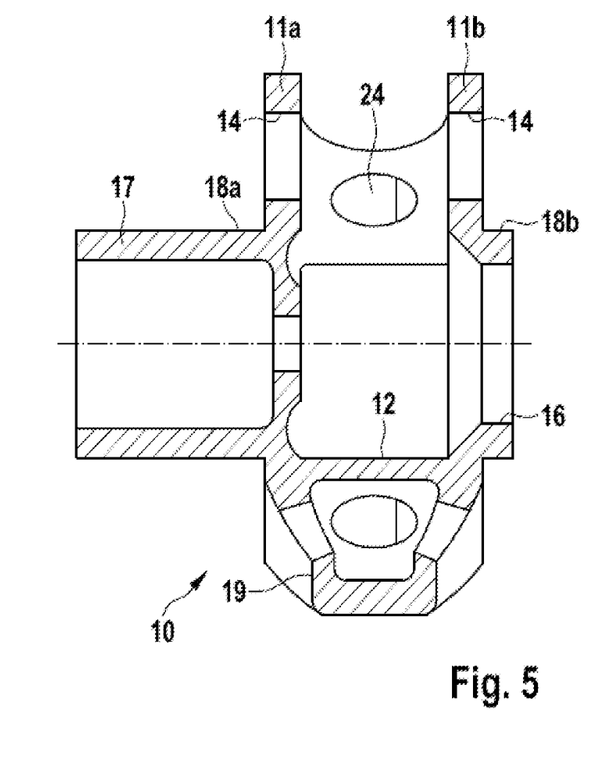
FIG. 5 shows a longitudinal section through the planetary carrier.
Figure 7:
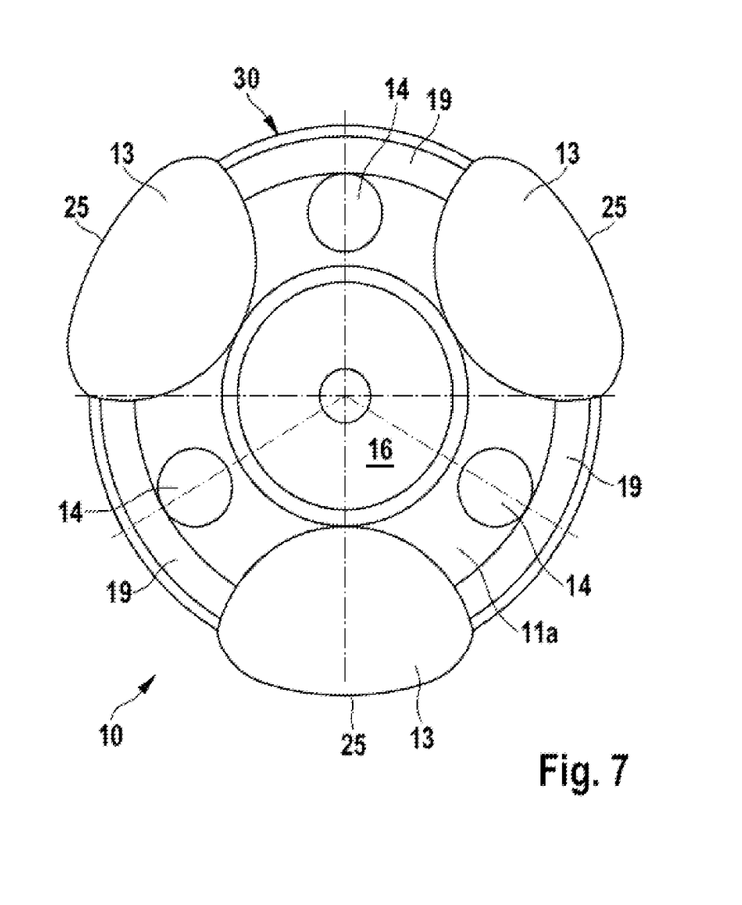
FIG. 7 shows a front view of a planetary carrier with a radial outer bulging of a planet web cheek in the region of an attachment to a planet web.
Figure 8:
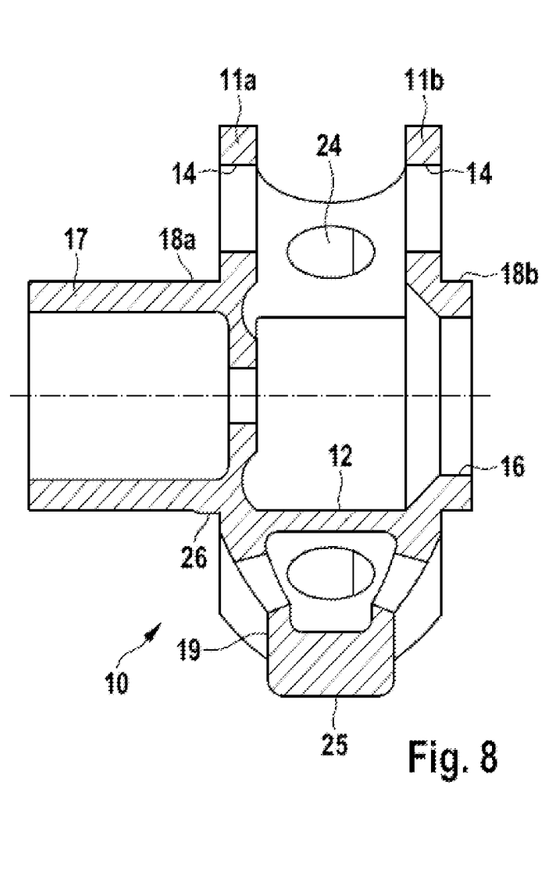
FIG. 8 shows a corresponding longitudinal section through the planetary carrier according to FIG. 7.

FIGS. 7 and 8 show views similar to FIGS. 2 and 5, wherein in this case the lateral surfaces of the planet webs 12 have outwardly pointing bulges 25. Furthermore, an indentation 26 on the inner face of the planet web 11a in the transition to the central bore 16, which constitutes a bearing opening for a sun gear, is provided in FIG. 8. The circumferential indentation 26 optimizes the planetary carrier 10, in particular in terms of casting.

Figure 9:
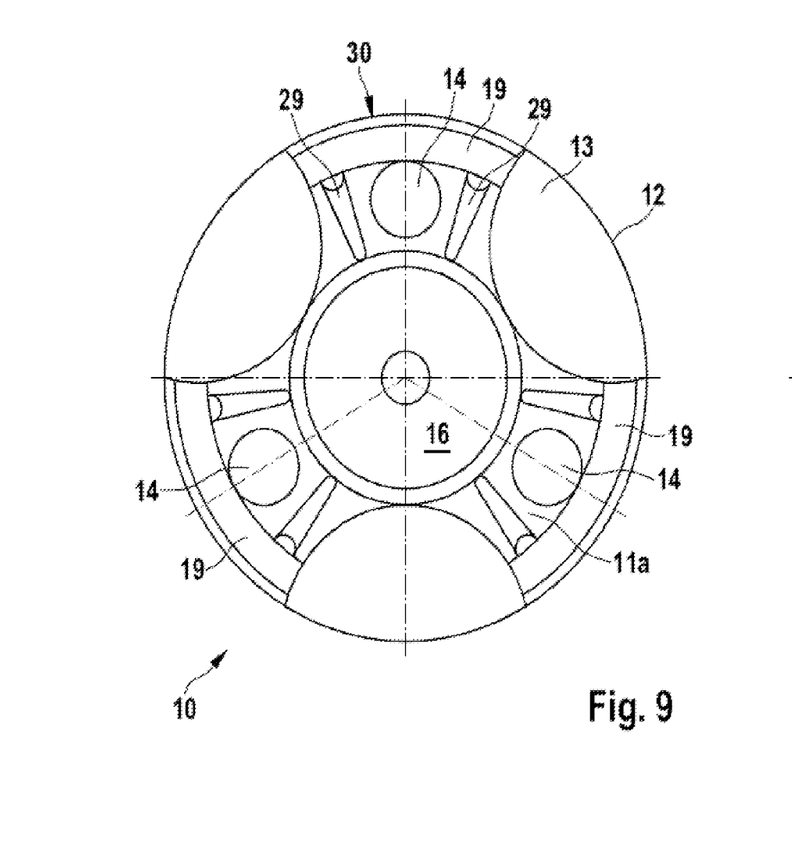
FIG. 9 shows a front view of a planetary carrier with a thickening, in the form of a protuberance, of a planet web cheek between a planet pin opening and a planet web.
Figure 10:
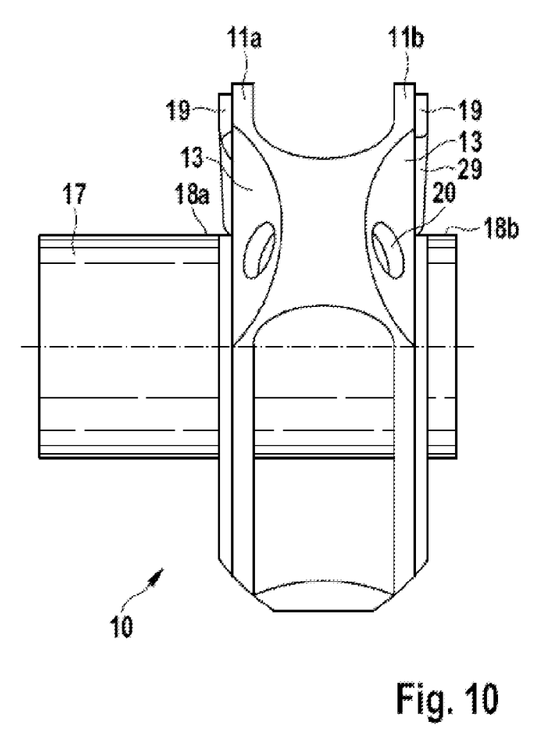
FIG. 10 shows a corresponding side view of the planetary carrier according to FIG. 9.

FIGS. 9 and 10, in contrast or in addition to the prior embodiments, show the arrangement of outer protuberances 29 on the planet web cheeks 11a, 11b, which are arranged to the side of the planet pin openings 14 and transition into the circumferential bead 19.

Figure 11:
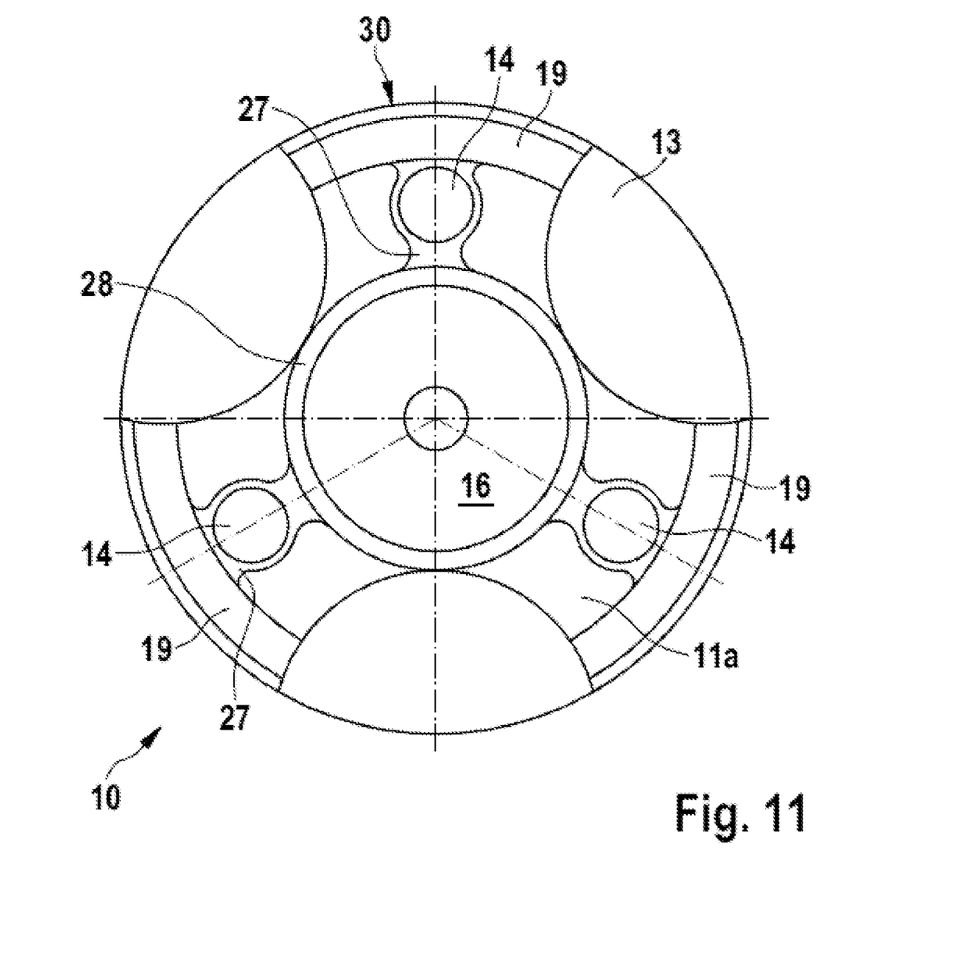
FIG. 11 shows a front view of a planetary carrier with an eyeglass-frame contour surrounding a planet pin opening and also with an axially open-worked spherical recess.

FIG. 11 lastly shows a framing of the planet pin openings 14 by an eyeglass-frame contour 27, which transitions into the outer bead 19 and into a rib 28 surrounding the central bore 16. The eyeglass-frame contour 27 also contributes to a reinforcement and therefore to an optimization of strength of the planetary carrier 10.

To conclude, it is noted that any combinations in particular of the individual features described in the figures can be implemented within the scope of the disclosure.

LIST OF REFERENCE SIGNS 1 wind turbine
2 tower
3 nacelle
4 generator transmission
5 drive shaft
6 output shaft
7 hub
8 rotor blade
9 generator
10 planetary carrier
11a, 11b planet web cheek
12 planet web
13 spherical recess
14 planet pin opening
15 planet gear space
16 through-opening
17 extension
18a, 18b bearing region
19 bead
20 aperture
21 geometry
22 cavity
23a, 23b circumferential wall
24 through-hole
25 bulge
26 indentation
27 eyeglass-frame contour
28 rib
29 protuberance
30 lateral surface opening
31 lateral surface

What is claimed is:

1. A planetary carrier of a planetary gearing, comprising: two planet web cheeks interconnected by planet webs, the sides of the planet web cheeks mutually opposed in the circumferential direction, together with outer lateral surfaces of the planetary webs, defining lateral surface openings,
wherein at least one planet web cheek defines at least one planet pin opening configured to received a pin configured to mount a planet gear,
wherein at least one planet web cheek, in the region of the attachment of a planet web, has a transition reducing the axial length of the planet web, the transition having a rounded contour,
wherein the planet web has a closed geometry or an open geometry, and
wherein the transition has a concave contour.

2. The planetary carrier according to claim 1, wherein the geometry is a triangular geometry.

3. The planetary carrier according to claim 1, wherein the concave contour is a spherical recess.

4. The planetary carrier according to claim 1, wherein the planet web defines a cavity arranged in the axial direction of the planetary carrier.

5. The planetary carrier according to claim 1, wherein the planet web cheek, on the outer circumference, has a projection in the form of a bead.

6. The planetary carrier according to claim 1, wherein the planet web cheek, between the planet web and the planet pin opening, has a thickening of the wall in the form of a protuberance.

7. The planetary carrier according to claim 6, wherein the planet web cheek, on the outer circumference, has a projection in the form of a bead, and wherein the thickening leads into the projection.

8. The planetary carrier according to claim 1, wherein an axial eyeglass-frame contour is arranged on the planet pin opening, the contour transitioning inwardly into a circumferential rib surrounding a central bore and outwardly into an outer bead.

9. The planetary carrier according to claim 1, wherein an indentation on an inner face of the planet web cheek is provided in the transition to a through-opening.

10. The planetary carrier according to claim 1, wherein the lateral surface of the planet web has a radial outer bulge.

11. The planetary carrier according to claim 1, wherein an aperture is formed in the transition.

12. The planetary carrier according to claim 1, wherein the planetary carrier is part of a fluid flow power plant transmission.

13. The planetary carrier according to claim 12, wherein the planetary carrier is part of a tidal power plant transmission or a wind turbine transmission.

14. A planetary carrier of a planetary gearing, comprising:
two planet web cheeks interconnected by planet webs, the sides of the planet web cheeks mutually opposed in the circumferential direction, together with outer lateral surfaces of the planetary webs, defining lateral surface openings,
wherein at least one planet web cheek defines at least one planet pin opening configured to received a pin configured to mount a planet gear,
wherein at least one planet web cheek, in the region of the attachment of a planet web, has a transition reducing the axial length of the planet web, the transition having a rounded contour,
wherein the planet web cheek, between the planet web and the planet pin opening, has a thickening of the wall in the form of a protuberance, and wherein the thickening is formed so as to become outwardly thicker in the radial direction in a triangular manner.

15. A planetary carrier of a planetary gearing, comprising:
two planet web cheeks interconnected by planet webs, the sides of the planet web cheeks mutually opposed in the circumferential direction, together with outer lateral surfaces of the planetary webs, defining lateral surface openings,
wherein at least one planet web cheek defines at least one planet pin opening configured to received a pin configured to mount a planet gear,
wherein at least one planet web cheek, in the region of the attachment of a planet web, has a transition reducing the axial length of the planet web, the transition having a rounded contour, and
wherein the planet web has at least one through-hole formed in a circumferential wall.

\* \* \* \* \*